Patented Dec. 4, 1934

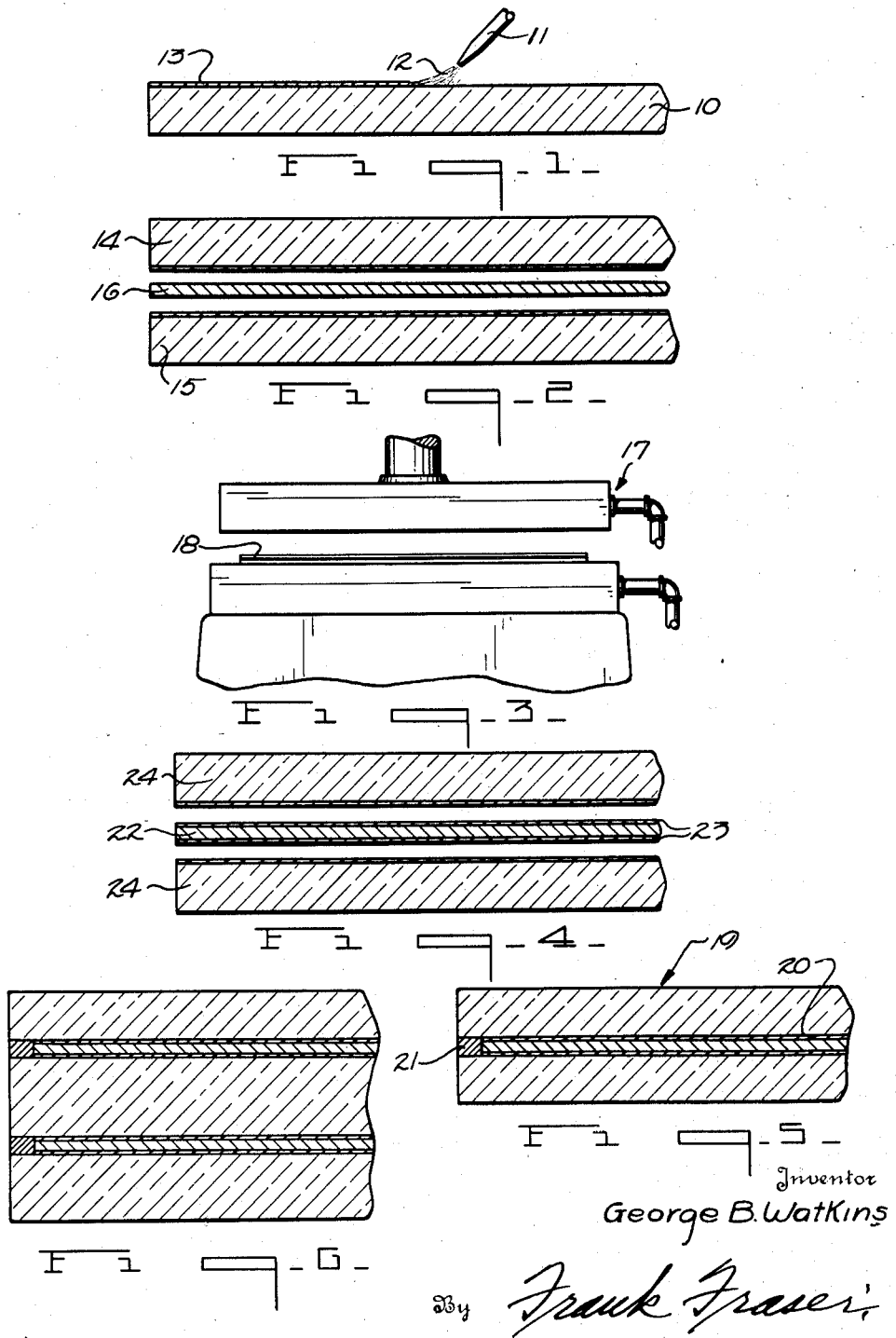

1,982,712

UNITED STATES PATENT OFFICE 1,982,712

PROCESS OF PRODUCING LAMINATED GLASS

George B. Watkins, Toledo, Ohio, assignor to Libbey-Owens-Ford Glass Company, Toledo, Ohio, a corporation of Ohio Application December 17, 1929, Serial No. 414,722

1 Claim. (Cl. 49—81)

The present invention relates to laminated glass and to the process of producing the same.

The expression "laminated glass" is used to designate a composite structure consisting of two or more sheets of glass and one or more non-brittle membranes all bonded together to produce what is known as a non-shatterable or non-scatterable glass. One of the chief difficulties encountered in the manufacture of such composite glass is the obtaining of an adequate and permanent bond between the laminations.

It is an aim of the present invention to produce a sheet of this character by employing a process wherein a bonding agent or bond inducing medium is employed that will give a satisfactory and permanent bond.

A further object of the invention is to provide such a process wherein the bonding medium is substantially insoluble in water whereby to render the sheet less susceptible to atmospheric conditions, etc.

Other objects and advantages of the invention will become more apparent during the course of the following description when taken in connection with the accompanying drawing.

In the drawing wherein like numerals are employed to designate like parts throughout the same, Fig. 1 is a fragmentary sectional view illustrating diagrammatically the application of my improved bonding medium to a sheet of glass, Fig. 2 is a similar section illustrating two sheets of glass properly treated and an untreated non-brittle membrane interposed therebetween, the laminations being illustrated in spaced relation for the purpose of clearness, Fig. 3 is a diagrammatic respresentation of a pressing mechanism that can be employed.

Fig. 4 is a view similar to Fig. 2, except the non-brittle membrane is illustrated as being provided with coatings of my improved bonding agent, and Figs. 5 and 6 are fragmentary sectional views through two different forms of composite sheets produced in accordance with the present invention.

Referring to Fig. 1, the numeral 10 designates a sheet of preferably transparent glass whose surfaces may be ground and polished, or not, as desired. Illustrated diagrammatically is a nozzle or spray gun 11 which may be used to spray the bonding agent 12 upon the glass to produce the deposit 13.

I have found that a mixture of relatively pure gelatin and rubber dissolved in a proper agent creates an extremely satisfactory bonding agent. As is shown in Fig. 2, two sheets of coated glass 14 and 15 have arranged therebetween a non-brittle membrane 16. Although the invention is not necessarily limited to any particular type of plastic material, nevertheless it is common practice to use a pyroxylin plastic sheet. When using such a sheet, I have found the following mixture to work satisfactorily.

From ten to fifty per cent of gelatin under the proper conditions may be mixed or colloidalized with relatively pure rubber, which mixture gives a relatively stiff jelly-like substance which is white in color. If preferred, a preservative such as thymol or potassium cresylate, etc. may be added in small quantities to prevent deterioration of the rubber gelatin jelly. To apply this mixture to the glass, it is first dissolved in a proper solvent or plasticizer and this may be done by placing it in diethylene glycol. From ten to twenty per cent of the rubber gelatin jelly may be dissolved in the diethylene glycol. Diethylene glycol is perfectly satisfactory when the non-brittle membrane 16 is formed from pyroxylin plastic, but obviously if a different plastic is used, a different solvent may be employed. This mixture is then sprayed upon the glass sheets as above described. After the solution is sprayed upon the surfaces of the glass sheets, the sheets and pyroxylin plastic may be immediately assembled into sandwich form without preliminary drying as illustrated, and placed in the press. It may be pointed out here that any type of pressing means, such as an autoclave or the like, can be used, although it is preferred that the sandwich be subjected to the combined action of heat and pressure during the pressing operation.

The numeral 17 is used to designate a form of press in its entirety, and it will be seen that the sandwich 18 is arranged between the platens thereof. In Fig. 5 is represented the finished composite sheet 19. For the sake of clearness, the films or coatings 20 of my rubber gelatin mixture have been illustrated in an exaggerated manner because in actual practice, the film is not discernible in the finished product. Although the rubber gelatin mixture is substantially insoluble in water, nevertheless because of the pyroxylin plastic sheet and also as a safeguard, it is preferred that the laminated sheet be sealed, and this is illustrated in Fig. 5 wherein the seal 21 is used. On the other hand, the use of the seal is not absolutely necessary. Fig. 6 shows what is known in the art as the "bullet-proof"

type of glass, and it consists of three sheets of glass and two sheets of non-brittle material as can be readily seen.

In Fig. 4 a modified arrangement is shown wherein the non-brittle membrane 22 is provided with the coatings 23 of the rubber gelatin solution as well as the surfaces of the glass sheets 24.

The development of let-goes in a laminated sheet must be considered in the manufacture of composite glass. Oftentimes glass which is bonded together will give the appearance of having a permanent bond, but subsequent to the manufacture of said sheet separations between the laminations will occur, and these separations are referred to in the art as "let-goes". Although "let-goes" may come about for various reasons, one of the main reasons in unsealed laminated glass is the action of the atmosphere upon the marginal portions thereof. I have found that the use of a mixture which is substantially insoluble in water is much more resistant toward the formation of "let-goes" than a substance which is soluble in water.

The gelatin in my mixture will adhere to the glass provided it is properly cleaned, while the diethylene glycol will have a solvent action upon the non-brittle membrane, particularly upon the elevation of the temperature thereof such as is done in the pressing means. The rubber also has adhesive properties for both the glass and the non-brittle membrane and in addition toughens and water-proofs the adhesive coating.

I claim:

The process of producing laminated glass comprising two or more sheets of glass and one or more non-brittle membranes, consisting in preparing a bond-inducing medium by first mixing rubber and gelatin in the desired proportions, then dissolving ten to twenty percent of the rubber gelatin mixture in diethylene glycol, then applying said mixture to one or more of the laminations, arranging the laminations in proper superimposed relationship and subjecting the sandwich to the action of heat and pressure to produce a composite structure.

GEORGE B. WATKINS.